INVENTOR.
Fred Mast

INVENTOR.
Fred Mast 3,397,313
APPARATUS FOR TRANSDUCING INFRA-RED IMAGES INTO VISIBLE IMAGES UTILIZING A LIQUID LIGHT CONTROL LAYER
Fred Mast, Zurich, Switzerland, assignor to Gretag Aktiengesellschaft, Regensdorf, Switzerland
Filed June 18, 1965, Ser. No. 465,041
Claims priority, application Switzerland, June 25, 1964, 8,319/64
32 Claims. (Cl. 250—83)

ABSTRACT OF THE DISCLOSURE

Apparatus for transducing an infra-red image into a visible image, having a liquid layer, an optical system for projecting an infra-red image on to said layer and a grating interposed between said optical system and said layer. The ratio of the period of the grating to the thickness of the liquid layer is chosen within the range of at least $2\pi$, preferably 100 to 300. As a result of said ratio the liquid layer can be locally deformed according to the intensity pattern of the infra-red radiation to produce an image in relief. The deformed layer being used to control visible light projected on to the layer and reflected therefrom through, for example, a Schlieren or phase-contrast optical system.

---

The invention relates to a device for making rays in the far infra-red visible by forming an infra-red image on a sensitive layer which can be locally deformed according to the intensity of the radiation to produce an image in relief, the deformed sensitive layer being used to control visible radiation projected on to the layer and reflected therefrom through, for example, a Schlieren or phase-contrast optical system.

It is well-known that any body whose temperature is above absolute zero emits heat rays in the infra-red range, and the intensity of the emission depends on the nature of the emitting surface and on the absolute temperature of the body. For many applications in the military, medical and industrial fields it is desirable to convert these infra-red rays into visible light so as to observe the body.

There are systems already known in which incident infra-red rays are transduced by means of image transducer tubes into a current of electrons, which is then amplified and made visible on a luminescent screen. However, these image transducing tubes have the disadvantage that only a small part containing little energy of the entire infra-red spectrum can be made visible, that is to say the part near the visible spectrum in the range approximately from $0.8\mu$ to $1.4\mu$, so that by far the greater and more energetic part of the infra-red spectrum cannot be exploited in this way.

Other systems are known to the applicant, for the purpose of utilising the entire infra-red spectrum between $1\mu$ and about $100\mu$, which are based on the most varied principles, and all have the disadvantage that they cannot display bodies moving fairly quickly.

For example one such system uses thermocouples, and another uses the well-known bolometer which under favourable circumstances takes more than one minute to produce a single picture making it impractical to reproduce images of moving bodies. There are instruments of this general kind which work faster, but they use semiconductor elements which have to be cooled with liquid helium or at least with liquid oxygen, and for some applications this involves serious disadvantages.

There is another known system which takes considerably less time, of about 10 seconds, to produce a single picture. This system uses a liquid medium which is evaporated or condensed locally to a greater or lesser extent as a function of incident heat rays. However, apart from the fact that 10 seconds is still, for some applications, too long a period for receiving a picture, the system has to be brought back to its initial state in order to produce a second picture which requires at least two minutes of time even in the hands of a skilled technologist. Thus even with this apparatus the interval of time required makes it impractical to provide a visible presentation of a moving body by means of infra-red rays when the body is moving too fast for the system.

In order to allow the observation of moving bodies or events by means of rays in the far infra-red region, there have also become known a number of image transducers which uses a sensitive layer which can be locally modified as a function of the intensity of the radiation, whereby these local modifications usually take the form of deformations of the surface of the sensitive layer. The resulting image in relief is used for controlling the light passing through an optical system, for example a Schlieren or phase-contrast optical system. But with such image transducers a difficulty arises in choosing a suitable sensitive layer because some sensitive layers have the disadvantage of poor sensitivity and/or are technically difficult to produce. For example, there is a rubber membrane which is stretched over a grating resting on a glass plate in such a way that there is provided a grating of individual hollow spaces containing air, which when subjected to infra-red rays expands to a certain extent causing the rubber membrane to become locally deformed. Another known sensitive layer consists of lamellae made of a synthetic material and mounted on the peaks of a comb-like surface, whereby the reflection properties of the lamellae are modified under the influence of infra-red rays. A further known sensitive layer consists of lamellae of mica or a polymer whereby the surfaces of the lamellae change with the absorption of heat rays. Finally a sensitive layer is known which consists of cells containing liquids or gases (hydrocarbons, HBr). In this layer it is not the surface which changes with the intensity of the infra-red radiation, but rather the refractive index. However, this latter form of layer is often very insensitive.

A prime object therefore of the present invention is to provide an image transducer of improved sensitivity.

Accordingly there is provided in an apparatus for detecting infra-red radiation the combination of a support with an optical flat surface and formal thereon a layer of low viscosity liquid and a grating having a period exceeding the thickness of said layer by a factor of at least $2\pi$ mounted adjacent to said layer to divide up incident infra-red radiation into areas to provide temperature gradients in said layer and thus deform said layer in accordance with the intensity pattern of the infra-red radiation.

Another object of the present invention is an apparatus for transducing an infra-red imagei into a visible image, comprising a layer of low viscosity liquid disposed on an optically flat surface of a support, a grating having a period exceeding the thickness of said layer by a factor of at least $2\pi$ mounted adjacent to said layer to divide up the incident infra-red image into a plurality of areas on said layer to provide temperature gradients therein and thus deform said layer in accordance with said infra-red image, a source of visible radiation arranged for illuminating said layer and an optical system for forming from the visible rays deflected by the surface of said layer a visible image of the infra-red image.

A preferred embodiment of the invention, will now be described, in detail with reference to the accompanying drawings in which.

Figure 1:
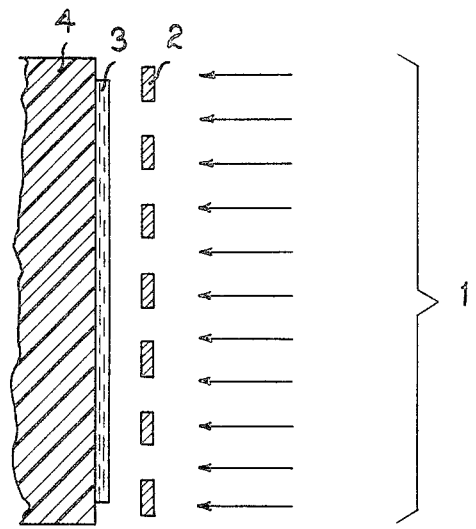
FIG. 1 is a section through the sensitive layer.

The principle of the image transducer according to the invention will first be described with the help of FIG. 1. Incident infra-red rays 1 pass through a grating 2 and a sensitive layer 3 to a support 4, where they are entirely absorbed. The support 4 has an optically flat surface on the side contiguous with the sensitive layer 3, and has an extremely low heat conductivity and high absorption properties for rays in the far infra-red. In what follows the expression "far infra-red" refers to the spectral region between $3\mu$ and $100\mu$. Particularly suitable materials for the base 4 have been found to be a various polyesters, metacrylates and epoxy resins. The incident radiation is stored in the base 4 as local heating and causes a change in the surface tension of the sensitive layer which results in troughs in the sensitive layer at the irradiated places. The sensitive layer 3 consists of a thin film of a low viscosity liquid; layer thicknesses of 0.2 to $10\mu$ have given the best results. Particularly suitable as a sensitive medium are low viscosity hydrocarbons such as, for example, decane, hexane or octane. These liquids have a viscosity from 0.4 to 1 centipoise and the relative change in surface tension with temperature lies between $3 \cdot 10^{-3}$ and $4 \cdot 10^{-3}$. The relative change in surface tension with temperature can be expressed by the formulation $\epsilon = d\alpha/\alpha dT$ where $\alpha$ is the surface tension and $dT$ is the change in temperature. By the device according to the present invention the factor $\epsilon$ is a criterion for the sensitivity.

The function of the grating 2 is to create temperature gradients on the sensitive layer 3 even under homogeneous illumination. This grating consists preferably of a metal grating in which the gap width and bar width are preferably the same.

In accordance to the present invention the following relationship was found:

$$\frac{2\pi \cdot z}{d} \ll 1$$

in which $z$ is the thickness of the sensitive layer and $d$ is the grating period, defined as the width of a gap and bar taken together.

By the supposition that the surface deformation $w$ is low in relation to the thickness $z$ of the layer, which will be reached in the practical realizations of the object of the present invention, it was found that, with a definite sensitivity $$\epsilon = \frac{d\alpha}{\alpha \cdot dT}$$

the deformation $w$ is proportional to the ratio $d/z$ or inversely proportional to the thickness $z$ of the liquid layer. On the other side it was found that the ratio $d/z$ cannot increase arbitrarily because the deformation of the liquid has to follow variations in temperatures on the layer with a short time constant. This ratio thus has an upper limit which, in addition to the desired time resolution of the system, depends on the choice of a number of material constants. In a practical realisation in which the ratio $d/z = 100$ to $300$, a favourable time constant of $\frac{1}{10}$ sec. has been obtained.

The time constant $\tau$, which is the interval at which two subsequent images can be observed, is composed of a mechanical time constant $\tau_m$, which the sensitive layer requires for flattening out the deformations, and a thermal time constant $\tau_T$, which determines the removal of locally stored heat. It was found that the two time constants can be calculated as follows:

$$\tau_m = \frac{2\eta d}{\alpha \cdot 2\pi \left(\frac{2\pi}{d} z\right)^3}$$

where $\eta$ is the viscosity of the sensitive layer in poises, and $\alpha$ is the surface tension in dyn./cm., while $$\tau_T = \frac{c}{2\lambda \left(\frac{2\pi}{d}\right)^2}$$

where $c$ is the specific heat in cal./cm.$^3$ and $\lambda$ the heat conductivity in cal./sec. cm. ° C. of the support. The resulting time constant $\tau = f(\tau_m, \tau_T)$ has the order of magnitude of the greater of the two time constants. One can without difficulty obtain $\tau = \frac{1}{20}$ sec., which corresponds to the visual resolution period of the human eye. In the formula for $\tau_T$ the thickness $z$ of the layer is neglected, because the liquid layer is too thin to influence the heat conductivity of the support.

Figure 2:
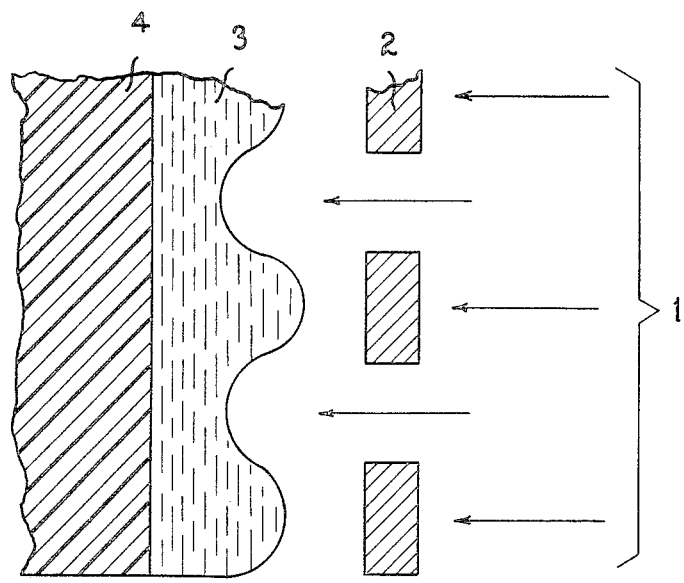
FIG. 2 is an enlarged view of part of FIG. 1.

FIG. 2 represents an enlarged view of part of FIG. 1, and it will be seen that the sensitive layer 3 has a trough at each place where the infra-red rays 1 penetrate through the grating 2, whereas where the grating screens the sensitive layer from the infra-red rays there occurs a moderate crest.

Figure 3:
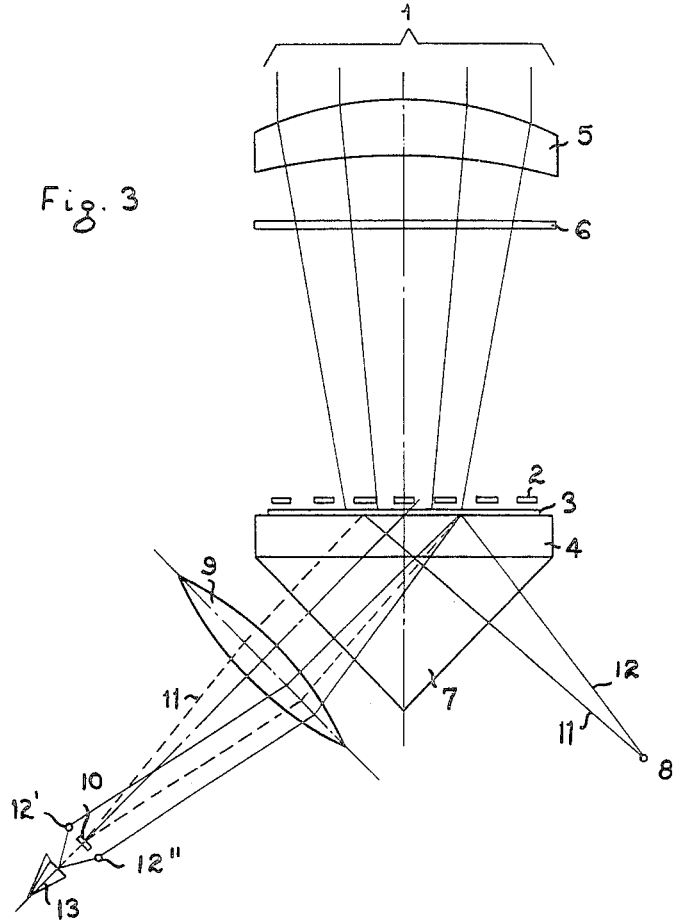
FIG. 3 is a diagram representing an image transducer according to the invention.

FIG. 3 shows a preferred version of an image transducer according to the invention. Incident infra-red rays 1 are first of all focussed by an infra-red optical system 5, and pass through an infra-red filter 6 and through the grating 2 to form an image on the sensitive layer 3. In order to make visible the resulting deformations in the sensitive layer 3 there is provided a light source 8, whose rays are projected through a prism 7 which is mounted on the side of the support 4 opposite to the sensitive layer 3. The rays from the light source 8 are reflected by that side of the layer 3 opposite to the side on which the infra-red rays are incident. The deviation of the reflected light is dependent on the deformations produced in the layer 3 by the incident rays. The reflected light rays are then focussed by a lens 9 which directs them to a Schlieren optical system 10, whereby those rays, for example 11 and 11′, which have been reflected from parts of the sensitive layer which are not subject to incident infra-red radiation are projected on to the bars of the Schlieren optical system and are not seen by the eye 13, whereas those rays, for example 12, 12′ and 12″, whose angles of reflection have been modified by deformations in the sensitive layer appear as image points outside the bars and symmetrically displaced each side of them. The greater the intensity of the incident infra-red rays, the more pronounced is the deviation of the light rays reflected from the layer 3, and the brighter appear the image points 12′ and 12″.

Other optical systems can of course be used for making visible the deformation in the sensitive layer, for example one can use a phase-contrast optical system.

Figure 4:
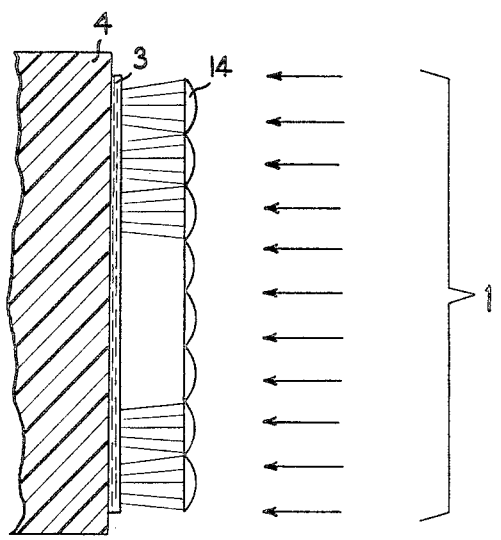
FIG. 4 is a modified form of the layer shown in FIG. 1.

Finally, FIG. 4 shows a variant of the layer 3 illustrated in FIG. 1, whereby the grating 2 of FIG. 1, which consists of a line or crossed grating, is replaced by a lens grating 14. The diameter of the individual lens of this lens grating is the same as the grating period $d$ of the line or crossed grating, and consequently the ratio of the layer thickness $z$ to the grating period $d$ is as before governed by the expression $2\pi z/d \ll 1$. The advantage of the lens grating compared to the line or crossed grating is that in the case of the lens grating all the infra-red rays 1 reach the sensitive layer 3, so that the latter has a network of points which cannot receive infra-red rays to produce temperature gradients in the layer 3. In this way the sensitivity can be increased by a factor of 2. The lens grating itself is made of a material transparent to infra-red rays.

What is claimed is:

1. In an apparatus for detecting infra-red radiation, the combination of a support with an optically flat surface and formed thereon a layer of low viscosity liquid and a grating having a period exceeding the thickness of said layer by a factor of at least $2\pi$ mounted adjacent to said layer to divide up incident infra-red radiation into areas to provide temperature gradients in said layer and thus deform said layer in accordance with the intensity pattern of the infra-red radiation.

2. The combination as claimed in claim 1, wherein the thickness of said layer is within the range of $0.2\mu$ to $10\mu$ and the ratio of the period of said grating to the thickness of said layer is within the range 100 to 300.

3. The combination as claimed in claim 1, wherein said grating is a bar and slot grating in which the total width of an adjacent bar and slot exceeds the thickness of said layer by a factor of at least $2\pi$.

4. The combination as claimed in claim 1, wherein said grating is a lens grating in which the diameter of each lens exceeds the thickness of said layer by a factor of at least $2\pi$.

5. The combination as claimed in claim 1, wherein said support consists of material having a low heat conductivity.

6. The combination as claimed in claim 5, wherein said support consists of material having high absorption properties for infra-red radiation.

7. The combination as claimed in claim 1, wherein said support consists of optically transparent material.

8. Apparatus for transducing an infra-red image into a visible image, comprising a layer of low viscosity liquid disposed on an optically flat surface of a support, a grating having a period exceeding the thickness of said layer by a factor of at least $2\pi$ mounted adjacent to said layer to divide up the incident infra-red image into a plurality of areas on said layer to provide temperature gradients therein and thus deform said layer in accordance with said infra-red image, a source of visible radiation arranged for illuminating said layer, an optical system for forming from the visible rays deflected by the surface of said layer a visible image of the infra-red image.

9. Apparatus as claimed in claim 8, wherein said support consists of material having a low heat conductivity.

10. Apparatus as claimed in claim 9, wherein said support consists of material having high absorption properties for infra-red radiation.

11. Apparatus as claimed in claim 8, wherein said support consists of optically transparent material.

12. Apparatus as claimed in claim 8, wherein the thickness of said layer is in the range of 0.2 to $10\mu$.

13. Apparatus as claimed in claim 12, wherein the ratio of the period of said grating to the thickness of said layer is within the range of 100 to 300.

14. Apparatus as claimed in claim 8, wherein said grating is a bar and slot grating in which the total width of an adjacent bar and slot exceeds the thickness of said layer by a factor of at least $2\pi$.

15. Apparatus as claimed in claim 8, wherein said grating is a lens grating in which the diameter of each of the lenses exceeds the thickness of said layer by a factor of at least $2\pi$.

16. Apparatus as claimed in claim 8, wherein said optical system is a Schlieren optical system.

17. Apparatus as claimed in claim 8, wherein said optical system is a phase contrast optical system.

18. Apparatus as claimed in claim 8 and further comprising a second optical system for forming an infra-red image on said layer, wherein said grating is interposed between said second optical system and said layer.

19. Apparatus as claimed in claim 8, wherein the material of said support is selected from the group consisting of polyesters metacrylates and epoxy resins.

20. Apparatus as claimed in claim 8, wherein said liquid is a hydrocarbon selected from the group consisting of decane, hexane and octane.

21. Apparatus for transducing an infra-red image into a visible image comprising a support with an optically flat surface and consisting of a material having a low heat conductivity and high absorption properties for infra-red radiation, a layer of low viscosity liquid having a thickness within the range 0.2 to $10\mu$ disposed on the optically flat surface of said support, an optical system for projecting an infra-red image on to said layer, a grating having a period exceeding the thickness of said layer by a factor within the range of 100 to 300 interposed between said optical system and said layer, a source of visible light arranged to project light on to the surface of said layer and a further optical system arranged for receiving light reflected from said surface and adapted to derive from said reflected light a visible image of said infra-red image.

22. Apparatus for transducing an infra-red image comprising a layer of low viscosity liquid disposed on an optically flat surface of an optically transparent support, an optical system for forming an infra-red image on said layer, a grating having a period exceeding the thickness of said layer by a factor of at least $2\pi$ interposed between said optical system and said layer to divide up said infra-red image into a plurality of areas on said layer to provide temperature gradients therein and thus deform the layer in accordance with said infra-red image, an optically transparent prism arranged on that side of said support which is opposite to the side facing said grating, a source of visible light arranged to project light through said prism, support and layer on to the surface of said layer and a further optical system for collecting light reflected from said surface through said prism and adapted to derive from said reflected light a visible image of said infra-red image.

23. Apparatus according to claim 22, wherein the thickness of said layer is within the range of $0.2\mu$ to $10\mu$ and the ratio of the period of said grating to the thickness of said layer is in the range of 100 to 300.

24. Apparatus according to claim 22, wherein said grating is a bar and slot grating in which the total width of an adjacent bar and slot exceeds the thickness of said layer by a factor of at least $2\pi$.

25. Apparatus according to claim 22, wherein said grating is a lens grating in which the diameter of each of the lenses exceeds the thickness of said layer by a factor of at least $2\pi$.

26. Apparatus according to claim 22, wherein the last mentioned optical system is a Schlieren optical system.

27. Apparatus according to claim 22, wherein the last mentioned optical system is a phase contrast optical system.

28. Apparatus according to claim 22, wherein said support consists of material having a low heat conductivity and high absorption properties for infra-red radiation.

29. Apparatus according to claim 22, wherein said support and prism consists of one piece of material.

30. Apparatus according to claim 22, wherein said support consists of material selected from the group consisting of polyesters, metacrylates and epoxy resins.

31. Apparatus according to claim 22, wherein said liquid is a hydrocarbon selected from the group consisting of decane, hexane and octane.

32. Apparatus as claimed in claim 8, wherein said grating has such a configuration that its image produced by the infra-red radiation on said layer is a grating in which the width of the "dark" stripes and the width of the infra-red spots are at least approximately equal.

References Cited

UNITED STATES PATENTS

| | | | |
|---|---|---|---|
| 3,114,836 | 12/1963 | Fergason et al. | 250—83 |
| 3,153,724 | 10/1964 | Demorest | 250—83.3 |
| 3,267,727 | 8/1966 | Benzinger | 73—190 |

RALPH G. NILSON, *Primary Examiner.*

S. ELBAUM, *Assistant Examiner.*